US010817614B2

(12) United States Patent
Burch et al.

(10) Patent No.: US 10,817,614 B2
(45) Date of Patent: Oct. 27, 2020

(54) AUTOMATIC DETECTION OF RELATEDNESS IN POOLS OF ENCRYPTED DATA

(71) Applicant: NetIQ Corporation, Provo, UT (US)

(72) Inventors: Lloyd Leon Burch, Payson, UT (US); Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 771 days.

(21) Appl. No.: 14/837,756

(22) Filed: Aug. 27, 2015

(65) Prior Publication Data

US 2016/0063000 A1  Mar. 3, 2016

Related U.S. Application Data

(60) Provisional application No. 62/042,302, filed on Aug. 27, 2014.

(51) Int. Cl.
   *G06F 21/62* (2013.01)

(52) U.S. Cl.
   CPC .. *G06F 21/6218* (2013.01); *G06F 2221/2107* (2013.01)

(58) Field of Classification Search
   CPC ........... G06F 17/30011; G06F 17/3002; G06F 17/30023; G06F 17/3005; G06F 17/301; G06F 17/30324; G06F 21/6218; H04L 9/00
   USPC .............................................. 726/22, 25, 26
   See application file for complete search history.

(56) References Cited

U.S. PATENT DOCUMENTS

| 7,171,619 | B1* | 1/2007 | Bianco | G06F 16/907 715/206 |
| 8,429,421 | B2 | 4/2013 | Chase et al. | |
| 2002/0194503 | A1 | 12/2002 | Faith et al. | |
| 2009/0259658 | A1* | 10/2009 | Hwang | G06F 16/168 |
| 2010/0014657 | A1* | 1/2010 | Kerschbaum | G06F 21/6245 380/28 |
| 2010/0057622 | A1 | 3/2010 | Faith et al. | |
| 2010/0313157 | A1* | 12/2010 | Carlsson | G06F 16/287 715/769 |
| 2011/0055192 | A1* | 3/2011 | Tang | G06F 16/3344 707/706 |
| 2011/0138190 | A1* | 6/2011 | Chase | G06F 21/6227 713/189 |

(Continued)

OTHER PUBLICATIONS

Somdip Dey, SD-AREE: A modified Caesar cipher cryptographic method along with bit-manipulation to exclude repetition form a message to be encrypted (Year: 2012).*

(Continued)

*Primary Examiner* — Pierre M Vital
*Assistant Examiner* — Andrew N Ho
(74) *Attorney, Agent, or Firm* — Schwegman Lundberg & Woessner, P.A.

(57) ABSTRACT

A pool of files are analyzed for relationships between the files. At least some of the files in the pool are encrypted files. The relationships are represented by distances between the files plotted on a graph in two or more dimensions. A point on the graph representing a particular file. The graph includes an interactive interface, such that points or clusters of points can be selected for re-analyzing and re-plotting on a refreshed graph for just those selected points or clusters.

19 Claims, 4 Drawing Sheets

(56) References Cited

U.S. PATENT DOCUMENTS

| | | | |
|---|---|---|---|
| 2012/0260205 A1* | 10/2012 | Rusu | G06Q 10/06 |
| | | | 715/771 |
| 2014/0280224 A1* | 9/2014 | Feinberg | G06F 16/9024 |
| | | | 707/748 |
| 2018/0069696 A1* | 3/2018 | Yoo | G06F 21/6245 |

OTHER PUBLICATIONS

Somdip Dey, SD-AREE: A modified Caesar cipher cryptographic method along with bit-manipulation to exclude repetition from a message to be encrypted (Year: 2012).*

* cited by examiner

AUTOMATIC DETECTION OF RELATEDNESS IN POOLS OF ENCRYPTED DATA

RELATED APPLICATIONS

This Application is a non-provisional of, is with, and claims the benefit of priority under 35 U.S.C. 119(e) to U.S. Provisional Patent Application Ser. No. 62/042,302, entitled: "Automatic Detection of Relatedness in Pools of Encrypted Data," filed Aug. 27, 2015; the disclosure of which in its entirety is incorporated by reference herein.

BACKGROUND

Individuals, organizations, governments, and enterprises likely have large amounts of confidential data that is encrypted. These entities have no idea how secure that encrypted data actually is. That is, once a file is encrypted it is likely forgotten. The entities assume the data is safe because it is encrypted.

However, not a day goes by without hearing on the news that some business or government entity had a hacker comprise its data in some way. Often times, the data was actually stored in encrypted formats by the businesses and the businesses state they believe the data was safe but to be sure they ask customers or users to change passwords and cancel credit cards or monitor unusual activity associated with customer accounts. In reality, the businesses have no idea how safe their encrypted data is and the public usually discovers months later that the alleged encrypted data was in fact not safe and the hackers broke the encryption.

An enterprise's most vital asset is the data which it creates and is entrusted to hold on behalf of customers. Every enterprise has to provide online solutions and access in the market place because it is being demanded by the customers and without such solutions and access, the enterprise would lose customers and business.

Therefore, an enterprise needs a mechanism that can inform the enterprise as to whether its encrypted data is truly secure.

SUMMARY

Various embodiments of the invention provide techniques for identifying relationships in pools of encrypted files. In an embodiment, a method for identifying relationships in pools of encrypted files is presented.

Specifically, a pool of encrypted files is identified and relationships are derived between each of the encrypted files. Next, each of the relationships are represented in a graph.

DETAILED DESCRIPTION

Figure 1:
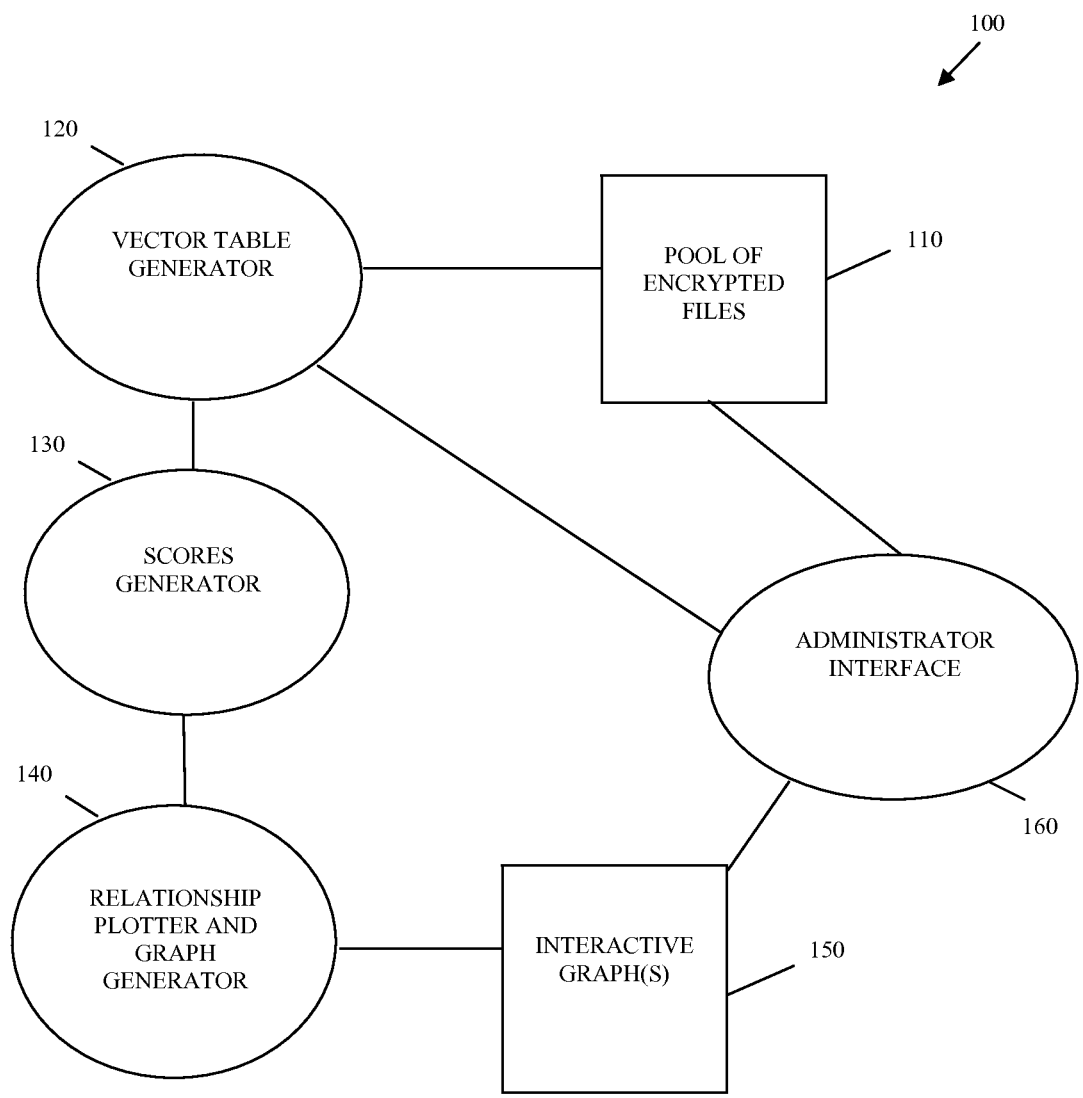
FIG. 1 is a diagram depicting an example encrypted file analysis system, according to an example embodiment.

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

A "pool of files" refers to any configurable grouping of files, such as but not limited to: files within a specific directory, files within sets of directories, files within a file system, files within sets of file systems, files within a disk, files within sets of disks, files manually selected and identified as a pool of files that span multiple directories, files within an entire processing environment, such as a cloud or a Virtual Machine (VM), and the like.

As used herein, a "relationship" is the distance between two plotted points in a graph. Each plotted point representing a scored encrypted file based on a bit-by-bit analysis of patterns found in that encrypted file, the dimensions used for the graph, and a reference point within the graph. The "strength" of any given relationship is said to be higher the shorter the distance and lower the longer the distance for that relationship.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within memory, a non-transitory computer-readable storage media and/or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram depicting an example encrypted file analysis system 100, according to an example embodiment. It is noted that the components of the encrypted file analysis system 100 reside on physical hardware resources, such as memory, storage, and hardware processors of a hardware device. Moreover, the encrypted file analysis system 100 is shown in greatly simplified form with just those components necessary for understanding the described embodiments presented.

The encrypted file analysis system 100 includes: a pool of encrypted files 110, a vector table generator 120, a scores generator 130, a relationship plotter and graph generator 140, one or more interactive graphs 150, and an administrator interface 160.

The components 120-160 are implemented as executable instructions that reside in non-transitory computer-readable storage media and/or hardware memory where the executable instructions are executed by one or more hardware processors of one or more hardware devices.

During operation of the encrypted file analysis system 100, an administrator accesses the administrative interface 160 and identifies (selects) through the administrator interface 160 the pool of encrypted files 110 that are to be analyzed for relationships between those encrypted files.

In an embodiment, the administrator interface 160 permits selection of the pool of encrypted files 110 by the administrator indicating through the interface 160 one or more of: specific encrypted files that may span multiple different directories or network locations, a file having a listing of encrypted files, an entire cloud storage environment, an entire VM storage environment, an entire storage device, sets of storage devices, and entire directory, sets of directories, an entire file system, sets of different files systems, and/or combinations of these things.

Once the administrator has selected and identified the pool of encrypted files 110. The administrator uses the administrator interface 160 to initiate analysis of the pool of encrypted files 110 for relationships between the encrypted files. In response to the administrator initiating the analysis, the vector table generator 120 is started and passed a reference or set of references to identify the pool of encrypted files 110.

The vector table generator 120, initially, generates a vector table from the pool of encrypted files 110. This is done by analyzing each encrypted file at the bit level (0's and 1's) identifying patterns (repeating strings of the bits) and maintaining a counter for how many times each pattern occurs within each encrypted file and within the pool of encrypted files 110 as a whole and maintaining encrypted file identifiers to associated with each file and its frequency count for each pattern. Once this is completed, the vector table generator 120 orders the rows of the vector table from most frequently occurring pattern within the pool of encrypted files 110 to least frequently occurring pattern within the pool of encrypted files 110. Each row includes entries for: a particular unique pattern, a total frequency count for that pattern within the pool 110, and a data structure that identifies each encrypted file (by encrypted file identifier) having that pattern, and a frequency count for that pattern for that encrypted file.

The generated vector table is passed to the scores generator 130. Any scoring approach can be used which uses a predefined reference point on a multi-dimensional graph to consistently score vectors for each encrypted file with respect to that reference point. The dimensions may be defined as a number representing either: the total number unique patterns identified from the vector table for the pool 110 or a total number of the most frequently occurring unique patterns identified from the vector table from the pool 110. The vectors for each encrypted file can be constructed by traversing the vector table for that encrypted file's identifier and obtaining a single encrypted file vector representing the unique patterns within that encrypted file along with each patterns frequency count (ordered from most frequently occurring pattern to least frequently occurring pattern). Once each encrypted file's vector is constructed from the vector table, the scores generator uses a selected scoring approach using the predefined reference point and the number of dimensions being used to score each of the encrypted files. Each encrypted file's identifier and corresponding generated score is then passed to the relationship plotter and graph generator 140.

The relationship plotter and graph generator 140 plots and graphs each encrypted file using that encrypted file's identifier and score on a graph representing the number of dimensions or to a graph representing two dimensions (X and Y) where the number of dimensions are mapped to the two dimensions. The plotted graph is then passed from the relationship plotter and graph generator 140 to the interactive graph(s) 150.

The interactive graph 150 renders the plotted graph to a screen on a display that is interfaced to the administrative interface. The rendered plotted graph provides a visualization of the distances between each plotted encrypted file in the number of dimensions or in the two dimensions (as discussed above). Moreover, the interactive graph 150 is itself an interface that can be interacted with through the administrator interface 160 and directed by the administrator. So, the administrator may place a cursor above a plotted point (encrypted file identifier) or group/cluster of points (list of encrypted file identifiers) and a popup window is rendered to visually provide the administrator with the encrypted file names (using the identifiers), file locations (full paths of where the encrypted files are located on a network), and other metadata. The administrator may also select clusters of points within the rendered plotted graph for further analysis. When this occurs, the selected encrypted file identifiers are provided to the administrator interface 160 and automatically sent back to the vector table generator 120, where the processing associated with the modules 120-150 reprocess resulting in a regenerated and new plotted graph in the interactive graph 150 for the selected cluster of encrypted file identifiers. Moreover, the scoring technique, the reference point, and the number of dimensions may be altered based on the new vector table generated by the vector table generator 120 when using just the selected cluster of encrypted files as a new pool of encrypted files. This can be iterated as many times and down to the finest level of detail that the administrator desires. The administrator may also use the administrator interface 160 to interact with the interactive graph 150 to call up a specific encrypted file for viewing or viewing its file system metadata.

In some embodiments, when the interactive graph 150 renders the plotted graphs different colors or visual cues may be rendered with the plotted clusters of encrypted files. Some visual cues may relate to where an encrypted file is located (such as a secure area within the network and those identified as a security concern should it be breached this can be done based on metadata associated with each encrypted file and a policy indicating the file paths of security concern). Other visual cues may indicate a potential cluster where the encrypted files plotted require further administrator evaluation to see if there is too much of a related pattern in those files, which may indicate that poor encryption is used (this can be done based on the distances between the plotted encrypted files). Still other visual cues may indicate a potential encryption failure or that no encryption was done on a plotted encrypted file at all (again this may be determined when such a file is plotted a large distance away from a nearest file in the pool 110).

The administrator uses the system 100 to analyze pools of encrypted files for purposes of determining whether: 1) some files are too related, which may mean that the encryption technique used is weak and may be breakable by a hacker, 2) the files have an even distribution indicating a very good and strong encryption technique was used such that it is unlikely a hacker can breach those files, 3) some files failed to be encrypted or had encryption failure indicating a security hole, 4) some files have a poor distributing indicating that a better encryption technique might be useful to prevent any file breach, 5) some files that should be located in a more secure area of the network are actually in an insecure area of the network (based on metadata and policy and based on visual cues provided in the plotted graph within the interactive graph 150 as discussed above), and other scenarios.

In an embodiment, the scoring generator 130 may use a mass vector quantization technique.

In an embodiment, the administrator through the administrator interface 160 may provide a candidate encrypted file or even encrypted string to the vector table generator 120, which the vector table generator uses as a search term into the generated vector table from the pool 110 and returns file identifiers having similar patterns or the pattern of the string identified therein. In this way, a listing of encrypted files can be found through a search that uses an encrypted file or an encrypted string as the search. This may be particularly useful to the enterprise in identifying when someone within the enterprise is distributing sensitive material and may be useful to law enforcement agencies when they know illegal activity is occurring but cannot determine what that illegal activity is or who is engaging in that illegal activity.

The system 100 allows an enterprise to interactively analyze, determine, and visualize how strong its encryption is and whether it needs changing to ensure content privacy. At no time is the actual content of the encrypted files exposed or decrypted; rather, an analysis of the content is performed by finding related patterns in the encrypted data and providing metrics and tools related to the related patterns for analysis (which can be automated or manual in nature). The techniques also provide for:

1. Evaluation of a pool of encrypted files to find discernable relationships in the pool.

2. Evaluation of pool of encrypted files where each of the files may have used different encrypted keys or mechanisms for encryption.

3. Identification of potential poor encrypted material without knowing the encryption technique and without exposing the encrypted material (through decryption) and without knowing the actual content associated with the encrypted material.

These and other embodiments are now discussed with reference to the FIGS. 2-4.

Figure 2:
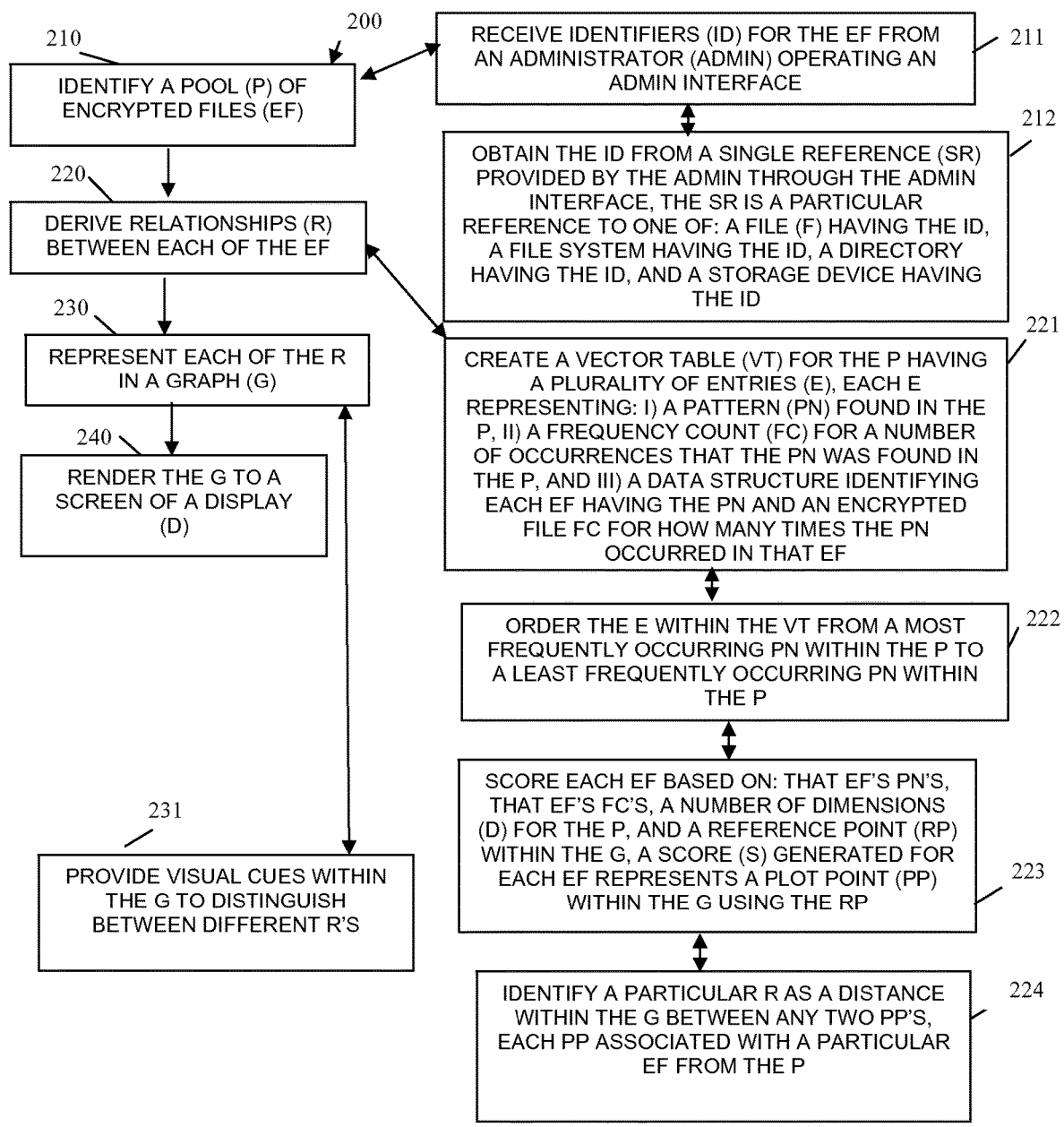
FIG. 2 is a diagram of a method for identifying relationships in pools of encrypted files, according to an example embodiment.

FIG. 2 is a diagram of a method 200 for identifying relationships in pools of encrypted files, according to an example embodiment. The method 200 is represented by one or more software modules (herein after referred to as an "encrypted relationship manager"). The encrypted relationship manager implemented as executable instructions that reside in memory or a non-transitory computer-readable storage medium, and the executable instructions executed by one or more hardware processors of one or more hardware devices. The encrypted relationship manager has access to one or more networks; the networks may be wired, wireless, or a combination of wired and wireless.

In an embodiment, the encrypted relationship manager is one or more of the software modules 120-160 of the FIG. 1.

In an embodiment, the encrypted relationship manager executes on a hardware server.

In an embodiment, the encrypted relationship manager executes on a desktop computer.

In an embodiment, the encrypted relationship manager executes on a hardware device of a cloud processing environment.

In an embodiment, the encrypted relationship manager executes on a hardware device underlying a VM.

At 210, the encrypted relationship manager identifies a pool of encrypted files. This can be done in a number of manners, some of which were described above with reference to the FIG. 1.

For example, at 211, the encrypted relationship manager receives identifiers for the encrypted files from an administrator operating an administrator interface, such as the administrator interface 160 of the FIG. 1.

In an embodiment of 211 and at 212, the encrypted relationship manager obtains the identifiers from a single reference provided by the administrator through the administrator interface. The single reference is a particular reference to one of: a file having the identifiers, a directory having the identifiers, a file system having the identifiers, and a storage device having the identifiers.

In some cases, the encrypted relationship manager may also obtain the identifiers by the administrator using the administrator interface to manually browse file directories or storage locations to make one or multiple selections of the encrypted files.

At 220, the encrypted relationship manager derives relationships between each of the encrypted files. This was described above with reference to the FIG. 1. The relationships represents the distances between plotted identifiers for the encrypted files within a graph and each plot point is based on a score received for the encrypted file. The score based on the bit patterns within the encrypted file, the frequency counts for each bit pattern, a reference point within the graph, and the number of dimensions being used for the graph and the score.

According to an embodiment, at 221, the encrypted relationship manager creates a vector table for the pool having a plurality of entries, each entry representing: i) a pattern found in the pool, ii) a frequency count for a number of occurrences that the pattern was found in the pool, and iii) a data structure identifying each encrypted file having the pattern and an encrypted file frequency count for how many times the pattern occurred in that encrypted file.

In an embodiment, the encrypted relationship manager creates the vector table in a manner described above with reference to software module 120 of the FIG. 1.

In an embodiment of 221 and at 222, the encrypted relationship manager orders the entries within the vector table from a most occurring pattern within the pool to a least frequently occurring pool within the pool.

In an embodiment of 222 and at 223, the encrypted relationship manager scores each encrypted file based on:

that encrypted file's patterns (as obtained by scanning the vector table entries), that encrypted file's encrypted file frequency counts (again as obtained by scanning the vector table entries), a number of dimensions for the pool (selected patterns or all unique patterns within the pool), and a reference point within a graph (such as the origin point in the dimensional space of the graph). A score is generated for each encrypted file and the score represents a plot point within the graph using the reference point.

In an embodiment of 223 and at 224, the encrypted relationship manager identifies a particular relationship as a distance within the graph between any two plot points. Each plot point associated with a particular encrypted file and identified by that particular encrypted file's computed score.

At 230, the encrypted relationship manager represents each of the relationships within the graph, such that each relationship is represented by a distance between two plotted points representing two encrypted files. A shorter distance indicating a stronger relationship and a longer distance indicating a weaker relationship.

According to an embodiment, at 231, the encrypted relationship manager provides visual cues within the graph to distinguish between different relationships. Visual cues can include, by way of example only, texture patterns, colors, size, font, effects (blinking), etc.

In an embodiment, at 240, the encrypted relationship manager renders the graph to a screen of a display for inspection and analysis by an administrator.

In an embodiment, the graph is presented within an interactive graph interface, such as what was described above with software module 150 of the FIG. 1.

In an embodiment, the graph is presented within an interactive graph interface, such as is described below with reference to the FIG. 3.

Figure 3:
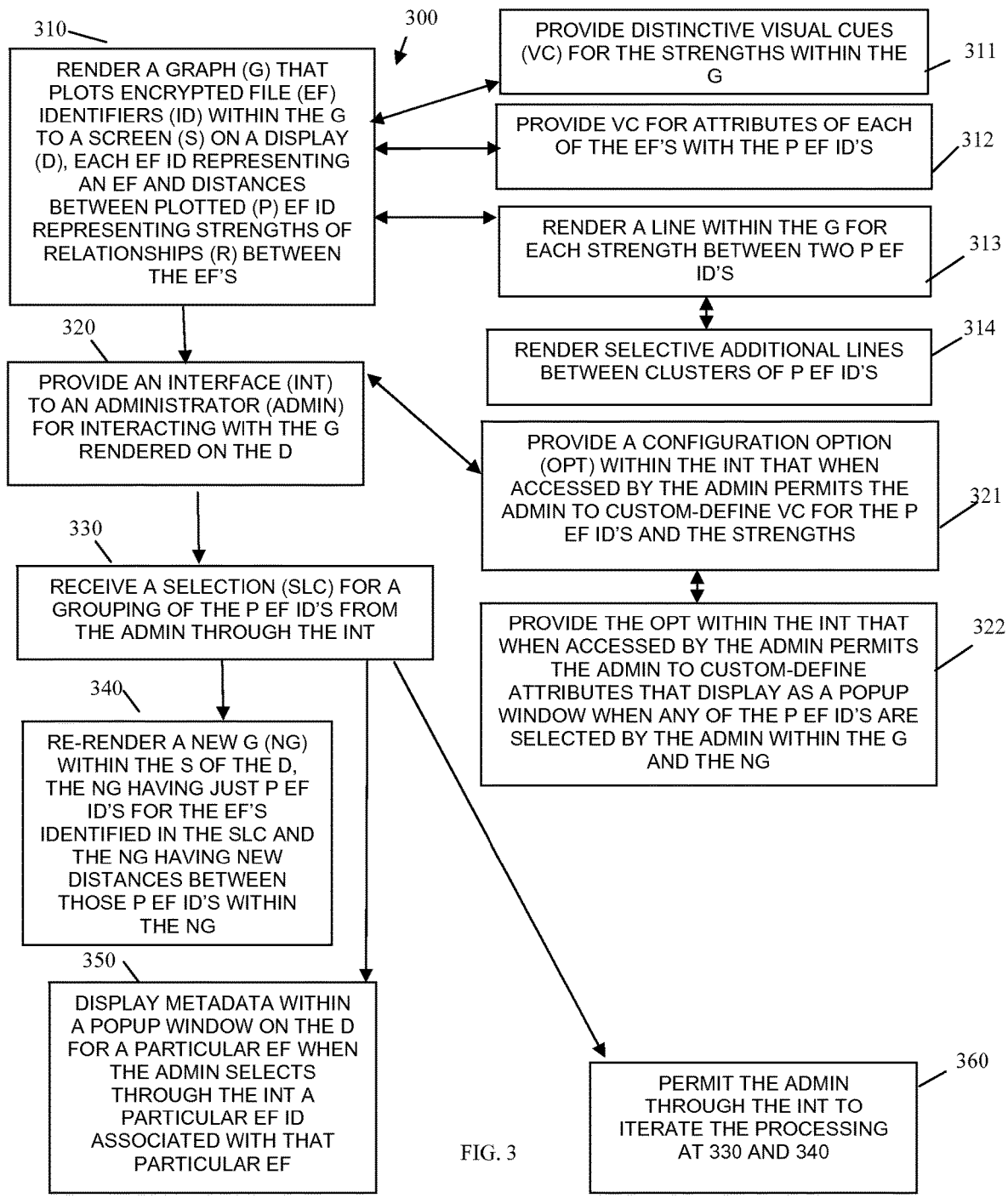
FIG. 3 is a diagram of a method for visualizing and interacting with clusters of related encrypted files, according to an example embodiment.

FIG. 3 is a diagram of a method 300 for visualizing and interacting with clusters of related encrypted files, according to an example embodiment. The method 300 is represented by one or more software modules (herein after referred to as a "visualization interface"). The visualization interface implemented as executable instructions that reside in memory or a non-transitory computer-readable storage medium, and the executable instructions executed by one or more hardware processors of one or more hardware devices. The visualization interface has access to one or more networks; the networks may be wired, wireless, or a combination of wired and wireless.

In an embodiment, the visualization interface is one or more of the software modules 150-160 of the FIG. 1.

In an embodiment, the visualization interface executes on a hardware server.

In an embodiment, the visualization interface executes on a desktop computer.

In an embodiment, the visualization interface executes on a hardware device of a cloud processing environment.

In an embodiment, the visualization interface executes on a hardware device underlying a VM.

In an embodiment, the visualization interface is an enhancement to or part of the method 200.

At 310, the visualization interface renders a graph that plots encrypted file identifiers within the graph to a screen on a display. Each encrypted file identifier representing an encrypted file, and distances between plotted encrypted file identifiers within the graph representing relationships and strengths of relationships between the plotted encrypted file identifiers. So, clustered and close together plotted points represent encrypted files with potentially strong (high strength) relationships between them.

In an embodiment, the graph is produced in accordance with the processing discussed above with reference to the FIG. 1.

In an embodiment, the graph is produced in accordance with the processing discussed above with reference to the FIG. 2.

In an embodiment, at 311, the visualization interface provides distinctive visual cues for the strengths within the graph.

In an embodiment, at 312, the visualization interface provides distinctive visual cues for attributes of each of the encrypted files within the plotted encrypted file identifiers.

In an embodiment, at 313, the visualization interface renders a line segment between pairs of the plotted encrypted file identifiers within the graph to represent strengths for each pair.

In an embodiment of 313 and at 314, the visualization interface renders selective additional lines between clusters of the plotted encrypted file identifiers. So, distances and the corresponding strength (high if a short distance and low if a long distance) between pairs of clusters can be represented by line segments within the graph by the visualization interface.

At 320, the visualization interface provides an interface to an administrator for interacting with the graph rendered within the screen on the display.

In an embodiment, the interface is the administrator interface 160 of the FIG. 1.

According to an embodiment, at 321, the visualization interface provides a configuration option within the interface that when accessed by the administrator permits the administrator to custom-define visual cues for the plotted encrypted file identifiers and the strengths.

In an embodiment of 321 and at 322, the visualization interface provides the configuration option within the interface that when accessed by the administrator permits the administrator to custom-define attributes that display as a popup window when any of the plotted encrypted file identifiers are selected by the administrator within the graph and the new graph (discussed below at 340).

At 330, the visualization interface receives a selection for a grouping/cluster of the plotted encrypted file identifiers from the administrator through the interface.

At 340, the visualization interface re-renders a new graph within the screen of the display. The new graph having just the plotted encrypted file identifiers for the encrypted file identifiers identified in the selection made of the grouping/cluster at 330. The new graph having new computed distances between those selected and plotted encrypted identifiers within the new graph. This re-computation and re-plotting was discussed above with reference to the FIG. 1.

According to an embodiment, at 350, the visualization interface displays metadata within a popup window on the display for a particular encrypted file when the administrator selects through the interface a particular encrypted file identifier associated with that particular encrypted file.

In an embodiment, at 360, the visualization interface permits the administrator through the interface to iterate the processing at 330 and 340. In this way, the level of detail between relationships of encrypted files can be drilled down and reformulated based on new selections of smaller groupings/clusters made by the administrator through the interface.

Figure 4:
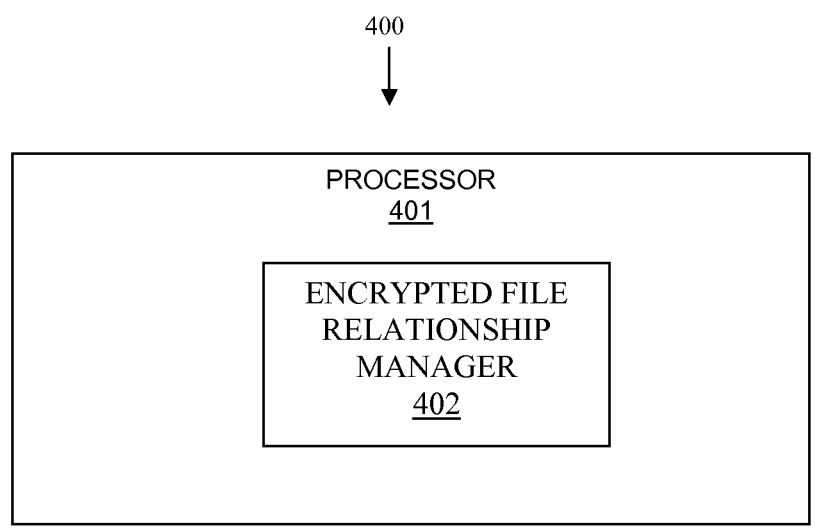
FIG. 4 is a diagram of another encrypted file analysis system, according to an embodiment.

FIG. 4 is a diagram of another encrypted file analysis system 400, according to an embodiment. Various components of the encrypted file analysis system 400 are software module(s) represented as executable instructions, which are programmed and/or reside within memory and/or non-transitory computer-readable storage media for execution by one or more hardware devices. The components and the hardware devices have access to one or more network connections over one or more networks, which are wired, wireless, or a combination of wired and wireless.

In an embodiment, the encrypted file analysis system 400 implements, inter alia, the processing depicted in the FIGS. 1-3. Accordingly, embodiments discussed above with respect to the FIGS. 1-3 are incorporated by reference herein with the discussion of the encrypted file analysis system 400.

The encrypted file analysis system 400 includes a hardware process 401 and an encrypted file relationship manager 402.

In an embodiment, the processor 401 is part of a hardware server.

In an embodiment, the processor 401 is part of a desktop computing device.

In an embodiment, the processor 401 is part of a hardware device that underlies a VM.

In an embodiment, the processor 401 is part of one or more hardware devices of a cloud processing environment.

The encrypted file relationship manager 402 is configured and adapted to: execute on the hardware processor 401, derive relationships between encrypted files, render within an interactive graph interface on a display a graph depicting plotted points within the graph for the encrypted files, and re-render a new graph on the display based on selections of the plotted points made through the interactive graph interface.

In an embodiment, the encrypted file relationship manager 402 is further configured and adapted to render and re-render the relationships within the graph and the new graph as distances between the plotted points and the selections of the plotted points.

In an embodiment, the interactive graph interface is the software modules 150 and 160 of the FIG. 1.

In an embodiment, the interactive graph interface is the method 300 of the FIG. 3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:

identifying a pool of encrypted files;

deriving relationships between each of the encrypted files by analyzing each encrypted file and identifying the relationships from the encrypted files, wherein analyzing further includes scoring each encrypted file, plotting scores for the encrypted files on a graph, and identifying each relationship as a particular distance between a first plotted point for a first encrypted file within the graph and a second plotted point for a second encrypted filed within the graph, wherein each plotted point represents a particular score for a given encrypted filed based on the scoring;

representing each of the relationships within the graph through plotted points of the scores for each encrypted file within the graph;

rendering the graph with the relationships for presentation on a display;

providing visual cues within the graph for each encrypted file, wherein providing further includes providing a first visual cue that indicates a first security concern based on a particular encryption used by the corresponding encrypted file that is based on repetitions of patterns detected within the corresponding encrypted file and rendering a second visual cue that indicates a second security concern based on a file path location of the corresponding encrypted file;

revising the graph for presentation on the display based on a user interaction provided through an interactive interface with the graph and identifying a subset of the encrypted files selected by the user through the user interaction;

iterating back to the deriving using the subset of the encrypted files as the encrypted files until no additional user interaction is provided through the interactive interface indicating the user is done revising the graph; and processing the method without decrypting any of the encrypted files and without exposing any actual content included in the encrypted files and preventing the actual content associated with the encrypted files from being exposed through the interactive interface.

2. The method of claim 1 further comprising, rendering the graph for presentation to a screen of a display.

3. The method of claim 1, wherein identifying further includes receiving identifiers for the encrypted files from an administrator operating an administrator interface.

4. The method of claim 3, wherein receiving further includes obtaining the identifiers from a single reference provided by the administrator through the administrator interface, wherein the single reference is a particular reference to one of: a file having the identifiers, a directory having the identifiers, a file system having the identifiers, and a storage device having the identifiers.

5. The method of claim 1, wherein deriving further includes creating a vector table for the pool having a plurality of entries, each entry representing: i) a pattern found in the pool, ii) a frequency count for a number of occurrences that the pattern was found in the pool, and iii) a data structure identifying each encrypted file having the pattern and an encrypted file frequency count for how many times the pattern occurred in that encrypted file.

6. The method of claim 5, wherein creating further includes ordering the entries within the vector table from a most frequently occurring pattern within the pool to at least frequently occurring pattern within the pool.

7. The method of claim 6, wherein ordering further includes scoring each encrypted file based on: that encrypted file's patterns, that encrypted file's encrypted file frequency counts, a number of dimensions for the pool, and a reference point within the graph, wherein a score generated for each encrypted file represents a plot point within the graph using the reference point.

8. The method of claim 7, wherein scoring further includes identifying a particular relationship as the particular distance within the graph between any two plot points, each plot point associated with a particular encrypted file from the pool.

9. The method of claim 1, wherein providing further includes providing third visual cues within the graph to distinguish between different relationships.

10. A method, comprising:

rendering a graph within an interactive interface by scoring encrypted files using the encrypted data of each encrypted file and plotting scores for each encrypted file on the graph, including encrypted file identifiers with the scores that are plotted, maintaining metadata with each encrypted file indicating a file path for the corresponding encrypted file, rendering the graph for presentation to a screen on a display, providing within the graph and for each encrypted file a first visual cue that indicates a first security concern based on a particular encryption used by the corresponding encrypted file that is based on repetitions of patterns detected within the corresponding encrypted file and providing a second visual cue that indicates a second security concern based on a file path location of the corresponding encrypted file, wherein each encrypted file identifier representing an encrypted file, and wherein distances between the scores plotted within the graph representing strengths of relationships between the encrypted files, wherein rendering further includes receiving the scores and the encrypted file identifiers from a process that analyzes each encrypted file without decrypting any of the encrypted files and without exposing any actual content included in the encrypted files;

providing the interactive interface to an administrator for interacting with the graph rendered on the display;

receiving a selection for a grouping of the plotted encrypted file identifiers from the administrator through the interactive interface;

iterating back to the rendering with the grouping as a subset of the encrypted files until no additional selection is received from the administrator through the interactive interface;

rendering a new graph within the interactive interface for presentation within the screen, the new graph having plotted encrypted file identifiers for the encrypted files identified in a last selection and the new graph having new distances between those plotted encrypted file identifiers within the new graph, wherein the new distances depicted within the new graph representing revised relationships between the encrypted files identified in the last selection; and preventing the actual content associated with the encrypted files from being exposed through the interactive interface.

11. The method of claim 10 further comprising, providing particular metadata for a popup window for presentation on the display for a particular encrypted file when the administrator selects through the interactive interface a particular encrypted file identifier associated with that particular encrypted file, wherein providing further includes providing a particular file location for the particular encrypted file when the particular metadata is displayed on the display.

12. The method of claim 10 further comprising, permitting the administrator through the interactive interface to iterate the receiving and the re-rendering processing.

13. The method of claim 10, wherein rendering the graph further includes providing third visual cues for the strengths within the graph.

14. The method of claim 10, wherein rendering the graph further includes providing third visual cues for attributes of each of the encrypted files with the plotted encrypted identifiers.

15. The method of claim 10, wherein rendering the graph further includes rendering a line within the graph for each strength between two plotted encrypted file identifiers.

16. The method of claim 15, wherein rendering the graph further includes rendering selective additional lines between clusters of plotted encrypted file identifiers.

17. The method of claim 10, wherein providing further includes providing a configuration option within the interactive interface that when accessed by the administrator permits the administrator to custom-define additional visual cues for the plotted encrypted file identifiers and the strengths.

18. The method of claim 17, wherein providing further includes rendering the configuration option for presentation within the interactive interface that when accessed by the administrator permits the administrator to custom-define attributes that display as popup windows when any of the plotted encrypted file identifiers are selected by the administrator within the graph and the new graph.

19. A system, comprising:
a hardware processor; and
non-transitory computer-readable storage medium comprising executable instructions;
executable
the executable instructions when executed by the hardware processor cause the hardware processor to:
derive relationships between encrypted files by analyzing each encrypted file to score each encrypted file and to identify distances between each score when plotted on a graph, the distances representing the relationships between the encrypted files, wherein the encrypted files are analyzed and scored without decrypting any of the encrypted files and without exposing any actual content included in the encrypted files;
render within an interactive graph interface for presentation on a display, the graph depicting plotted points for the scores within the graph for the encrypted files;
providing visual cues within the interactive graph for each encrypted file, wherein providing further includes providing a first visual cue that indicates a first security concern based on a particular encryption used by the corresponding encrypted file that is based on repetitions of patterns detected within the corresponding encrypted file and presenting a second visual cue that indicates a second security concern based on a file path location of the corresponding encrypted file;
receive a selection of the plotted points made through the interactive graph interface;
iterate back to deriving the relationships with the selection of the plotted points as a subset of the encrypted files until no additional selection is received through the interactive graph interface;
render a new graph for presentation on the display and within the interactive graph interface based on a last selection of the plotted points made through the interactive graph interface; and
prevent the actual content associated with the encrypted files from being exposed through the interactive graph interface.

* * * * *